July 10, 1934.  J. C. SLONNEGER  1,966,107
TORQUE CONVERTER
Filed Dec. 27, 1932

INVENTOR
John C. Slonneger
BY
ATTORNEY

Patented July 10, 1934

1,966,107

UNITED STATES PATENT OFFICE 1,966,107

TORQUE CONVERTER

John C. Slonneger, Milwaukee, Wis., assignor to The Falk Corporation, Milwaukee, Wis., a corporation of Wisconsin Application December 27, 1932, Serial No. 648,902

7 Claims. (Cl. 74—34)

This invention relates to torque converters of the type wherein inertia forces and particularly centrifugal forces are utilized to transmit power from a driving to a driven member.

Of the many forms of torque converters of this type heretofore designed, none have proven industrially practicable. In the main they have consisted of a revolving system of unbalanced masses energized by the driver and reacting to impose a torque on the driven member. The masses are commonly mechanically free to rotate about their individual axes in response to relative rotation between the driving and driven members, and the torque applied to the driven member results substantially solely from the resistance offerded to such individual rotation by the centrifugal forces set up as a result of the travel of the masses about the axis of the revolving system.

If the centrifugal forces, thus set up, are increased sufficiently to hold the masses against individual rotation, in opposition to the torque resistance offered by the driven member, then the driven member rotates in unison with the driver. Under that condition of operation, the component parts of the revolving system remain stationary relative to each other and a continuous substantially uniform torque is transmitted to the driven member.

However, when the centrifugal forces, thus set up, are insufficient to prevent rotation of the masses about their individual axes, the developed torque fluctuates periodically between wide limits. Under that condition of operation in torque converters heretofore designed, the torque fluctuates between positive and negative values, imposing severe shocks on the mechanism and reducing the average torque to an insignificant value. These undesirable conditions are further aggravated by the centrifugal forces which result from the rotation of the masses about their individual axes and which tend to periodically accelerate and decelerate the revolving system, thus increasing the magnitude of the torque fluctuations and increasing the severity of the shocks. Because of these conditions, such a system is ordinarily incapable of bringing the speed of the driven member up to that of the driver, particularly, if the driven member is under any substantial torque load.

Inability to satisfactorily overcome those conditions accounts for the lack of success heretofore had with torque converters of this general type, although many attempted solutions of this problem have been offered. Many forms of force commutators, involving ratchets, overrunning clutches, or the like, have heretofore been proposed, in an effort either to eliminate the intermittently recurring negative torques or to reverse the effect thereof upon the driven member. Such devices not only complicate the design and the mechanical problems involved, but none have yet been suggested that are capable of withstanding the severe and rapidly recurring shocks to which they are ordinarily subjected, and none cope with those centrifugal forces which tend to periodically accelerate and decelerate the revolving system.

An aim of the present invention is to provide a torque converter in which the objectionable characteristics above mentioned are satisfactorily overcome. I have discovered that if those centrifugal forces which tend to periodically accelerate and decelerate the revolving system be eliminated, the problem of eliminating those objectionable negative torques or reducing them to a negligible factor, becomes less serious, and that problem I have solved without the use of ratchets, overrunning clutches or like force commutating mechanisms.

More specific objects of this invention are to substantially eliminate those centrifugal forces which, in prior torque converters, tend to periodically accelerate and decelerate the revolving system during relative rotation between the driving and driven members; and to eliminate or reduce to a neglible factor those negative torques which, in prior designs, have necessitated the use of ratchets, overrunning clutches, or the like.

Other objects and advantages will appear from the following description of an illustrative embodiment of the present invention.

In the accompanying drawing:—

Figure 1:
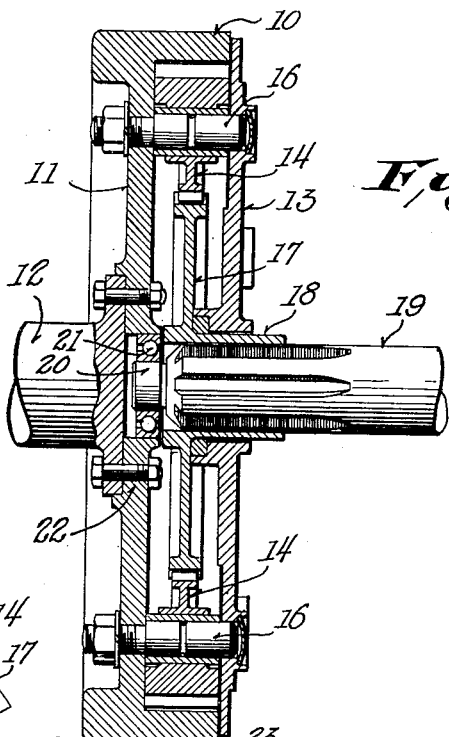
Figure 1 is a sectional view of a torque converter constructed in accordance with the present invention.

The torque converter selected for illustration is shown housed within an engine fly wheel having a rim 10 and web 11 bolted to a flanged drive shaft 12. A disk 13, fixed to the rim 10, cooperates with the fly wheel to complete an oil tight enclosure for the active parts of the device.

The torque converter shown comprises several pairs of pinions 14 and 15, each freely rotatable on individual stub shafts 16 which are securely anchored in the web 11 of the fly wheel so as to revolve therewith. The shafts 16 preferably project into appropriate sockets in the disk 13 to provide additional support therefor. In this instance four pairs of pinions are shown symmetrically disposed about the center of the fly wheel to avoid unbalancing the same.

Each of the pinions 14 meshes with a gear 17 having a hub 18 splined on the end of a driven shaft 19. The shaft 19 is arranged coaxially of the drive shaft 12 and is preferably provided with a reduced extension 20 journalled in an appropriate bearing 21 seated in the hub 22 of the fly wheel. The arrangement is such that when the drive shaft 12 is rotated with respect to the driven shaft 19 the several pinions 14 revolve with the fly wheel, these pinions being also mechanically free to rotate in the same direction about their individual shafts 16 as a result of their engagement with the gear 17.

The several pinions 15 are of the same diameter as the pinions 14, and each meshes with one of the pinions 14, so as to rotate therewith at the same speed but in reverse direction. Each of the pinions 15 is so disposed as to avoid engagement with the gear 17, and in this instance is spaced outwardly therefrom.

The several pinions 14 and 15 are eccentrically loaded, as by counterweights 23, and so arranged that during rotation thereof the eccentric center of gravity of each approaches an outer dead center position substantially simultaneously with those of the others, and likewise approaches an inner dead center position simultaneously with the others. The same phase relation is thus maintained between the unbalanced masses of both pinions of a pair during rotation thereof in opposite directions.

During rotation of the drive shaft 12, and consequent revolution of the unbalanced pinion masses therewith, the centrifugal forces acting on those masses tend to retain the centers of gravity thereof in their outermost positions and thus tend to hold the pinions against rotation about their individual axes. This effect is opposed, however, by the torque load on the driven shaft 19 which, reacting through the gear 17, tends to cause rotation of the pinions.

When the centrifugal forces, thus acting, are sufficient to hold the pinions against individual rotation, in opposition to the torque load on the driven shaft, the driven shaft then rotates at the same speed as the drive shaft by reason of the continuous torque thus applied to the gear 17 from the pinions.

When the centrifugal forces, thus acting, are insufficient to overcome the opposition of the torque load on the driven shaft, the several pinions then rotate about their individual axes at a rate corresponding to the rate of relative rotation between the driving and driven shafts.

During rotation of the pinions, additional centrifugal forces are set up as a result of the rotation of each unbalanced pinion mass about its individual shaft 16, and as each of these additional forces continuously changes its direction with respect to the revolting system, including the fly wheel, the effect of each is to periodically accelerate and decelerate the system.

Figure 2:
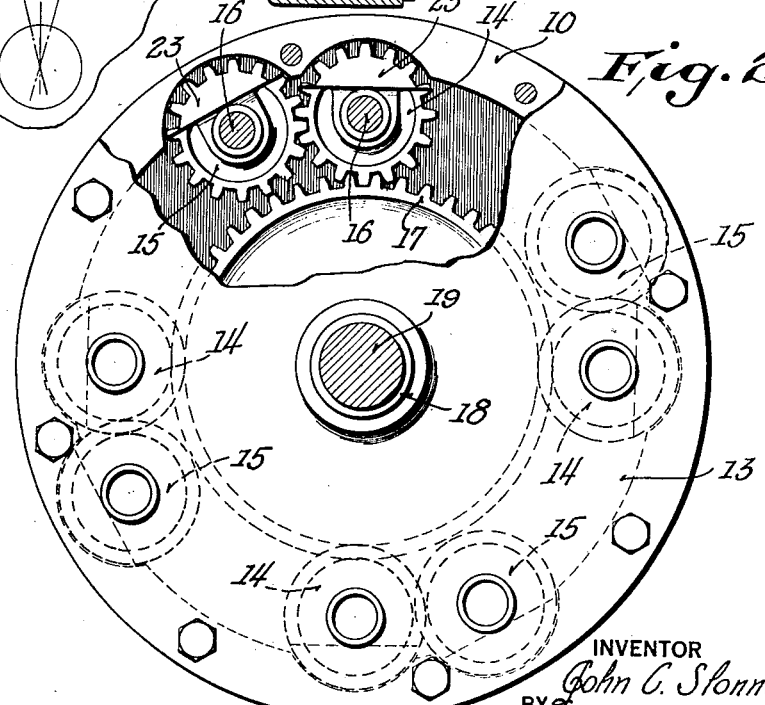
Fig. 2 is a view in end elevation, partly in section, of the device shown in Fig. 1.

For instance, let it be assumed that the system is revolving clockwise (Fig. 2), that the gear 17 is stationary, and, as a consequence, that the pinions 14 are rotating clockwise about their respective centers. Then the centrifugal effect of the counterweight 23 of each pinion 14, when passing through a position ninety degrees from that shown, sets up a force tangential to the revolving system tending to accelerate the same. Also, the centrifugal effect of that counterweight, when passing through a two hundred and seventy degree position, sets up a force tangential to the system tending to decelerate it. These forces, if unopposed, would tend to periodically increase and decrease the rate of revolution of the system, including the fly wheel, thereby causing the torque, applied to the gear 17, to fluctuate periodically between positive and negative values.

In the torque converter shown, however, these accelerating and decelerating tangential forces, resulting from the individual rotation of the unbalanced pinions 14, are continuously nullified by the equal and opposite tangential forces resulting from the simultaneous reverse rotation of the unbalanced pinions 15, so that the torque applied to the gear 17 by the revolving system is unaffected by those additional centrifugal forces which result from individual rotation of the pinions. With the effect of those additional forces thus eliminated, the degree of fluctuation in the torque transmitted to the gear 17 is reduced and those negative torques, so characteristic of prior torque converters of this type, are substantially eliminated, or at least so reduced as not to impair the functioning of the device.

The fact that negative torques are substantially eliminated in the torque converter shown is susceptible of mathematical proof and may also be explained as follows.

Figure 3:
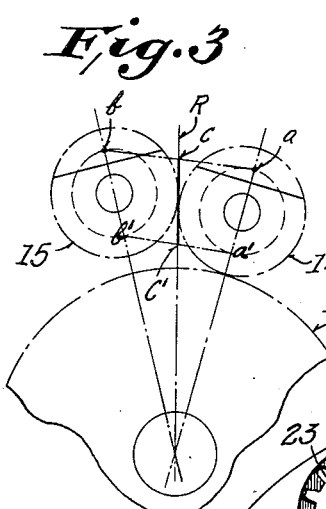
Fig. 3 is an explanatory diagram.

Referring to the diagram of Fig. 3, let $a$ and $b$ represent the centers of gravity of the unbalanced pinions 14 and 15, of a pair. Since the pinion masses are substantially equal, the point $c$ in the middle of the line $a$—$b$ represents the center of gravity of the combined pinion masses. During rotation of the pinions, the line $a$—$b$ reciprocates, parallel to itself, between the outer position shown and inner position $a'$—$b'$, with the center $c$ reciprocating along the line $c$ and $c'$, which is substantially coincident with a radius R of the revolving system.

Now let it again be assumed that the system is revolving clockwise with respect to the gear 17 under the action of a driving torque supplied from the shaft 12. Then during that stage of the cycle when each of the centers of gravity $c$ is moving inwardly, that movement opposed by centrifugal force, is effected by the reaction between each of the pinions 14 and the gear 17. This reaction produces a force tending to rotate the gear 17 clockwise against the resistance offered by the torque load on the driven shaft 19. This inward movement in a direction opposed to centrifugal force intensifies that force and correspondingly intensifies the reaction between the pinions 14 and gear 17, and this intensified reaction transmitted through the system sets up a high resistance against the driving torque supplied from the shaft 12.

Thereafter, during that stage of the cycle when each of the centers of gravity is moving outwardly, centrifugal force tends to accelerate that movement, although the intensity of that force is actually reduced by reason of the fact that such outward movement is in the direction of that force. This action reduces the reaction between the pinions 14 and gear 17, thereby reducing the resistance to the driving torque supplied from shaft 12, and consequently rendering that torque effective to accelerate the system. In the torque converter shown, acceleration of the system during this stage is made possible by reason of the elimination of those additional centrifugal forces, hereinabove mentioned, which, in prior torque converters, tend to decelerate the system during this stage. This acceleration is normally sufficient to avoid any material negative reaction between the pinions 14 and gear 17, and under normal conditions is sufficient to maintain a substantial reaction between these pinions and gear in such direction as to urge the gear to rotate clockwise during this stage.

It will thus be noted that a positive torque is applied to the gear 17 during that stage when the centers of gravity c are moving inwardly, by reason of the centrifugal forces acting on them at that time, and that this torque, though reduced, is substantially maintained during that stage when the centers of gravity c are moving outwardly, by reason of the acceleration imparted to the system by the driving torque (supplied from shaft 12) which is unresisted at that time by the centrifugal forces then acting.

The torque converter shown permits the driver to start under practically no-load condition, regardless of the amount of torque load on the shaft 19, since the shaft 19 can offer no resistance to rotation of the system until a substantial speed of rotation of the system has been attained. Thereafter, the torque applied to the driven shaft 19 increases rapidly, as the speed of the driver and system increases, until the torque, thus developed, is sufficient to overcome the torque load on the shaft 19.

Until the shaft 19 moves, however, no energy is of course absorbed thereby, and, except for slight friction losses, the only energy given up by the driver is the kinetic energy imparted to and stored up in the system.

When the shaft 19 starts rotating, it will ordinarily accelerate until it reaches a speed at which the rate of energy absorbed by it from the system is substantially equal to the rate of energy absorbed by the system from the driver. This ultimate speed of the shaft 19 may be equal to or less than the speed of the driver.

When the speed of the shaft 19 is less than that of the drive shaft 12, the torque applied to the shaft 19 fluctuates, the fluctuations occurring at a rate dependent upon the difference in the rate of rotation between the two shafts. The torque, thus applied, though sometimes intermittent, is unidirectional, and tests show that the magnitude of the torques, thus applied, is proportional to the rate of torque fluctuations. The torque applied to the driven shaft therefore increases as the speed ratio between the driving and driven shafts increases, which is an ideal condition.

When the speed of the shaft 19 is equal to that of the drive shaft 12, the pinions 14 and 15 do not rotate but apply a continuous steady torque to the shaft 19 equal to the torque load thereon.

Various changes may be made in the embodiment of the invention hereinabove specifically described without departing from or sacrificing the advantages of the invention as defined in the appended claims.

I claim:—

1. In a torque converter the combination of a driven gear, and a system of gears revolvable with respect to said driven gear, said system including an eccentrically loaded gear meshing with said driven gear and individually rotatable during revolution of said system with respect to said driven gear, said system also including a second eccentrically loaded gear connected to rotate simultaneously with and at the same speed as said first named eccentrically loaded gear but in opposite direction.

2. In a torque converter the combination of a driven rotary element, and a system of gears revolvable with respect to said driven element and connected in driving relation therewith, said system including a pair of eccentrically loaded gears connected for simultaneous rotation at the same speed but in opposite directions in response to revolution of said system with respect to said element.

3. In a torque converter the combination of a driven rotary element, and a mechanical system revolvable with respect to said element and connected in driving relation therewith, said system including a pair of eccentric masses connected for individual rotation at the same speed but simultaneously in opposite directions in response to revolution of said system with respect to said element.

4. In a torque converter the combination of a driven rotary element, a rotary carrier, a pair of eccentric masses individually rotatable on said carrier, and connections for effecting simultaneous rotation of said masses at the same speed but in opposite directions in response to relative rotation between said carrier and said element for transmitting a driving torque to said element.

5. In a torque converter the combination of a driven rotary element, a rotary carrier, a pair of eccentric masses on said carrier connected to rotate simultaneously at the same speed but in opposite directions during rotation of said carrier with respect to said element, said masses being arranged so that their combined center of gravity reciprocates substantially radially of said carrier during such rotation, and torque transmitting connections between said masses and said element.

6. In a torque converter the combination of a driven gear, a rotary carrier, mechanism movably mounted on said carrier, and connections between said mechanism and gear for effecting reciprocation of the center of gravity of said mechanism substantially radially of said carrier in response to relative rotation between said carrier and gear.

7. In a torque converter the combination of a driven gear, a rotary carrier, mechanism movably mounted on said carrier, and connections between said mechanism and gear responsive to rotation of said carrier relative to said gear for effecting reciprocation of the center of gravity of said mechanism toward and from the axis of said carrier along a path fixed with respect to said carrier.

JOHN C. CLONNEGER.